United States Patent
Zhao et al.

(10) Patent No.: US 12,222,846 B2
(45) Date of Patent: *Feb. 11, 2025

(54) METHODS AND SYSTEMS FOR AUTOMATED TESTING USING BROWSER EXTENSION

(71) Applicant: Capital One Services, LLC, McLean, VA (US)

(72) Inventors: Jiawei Zhao, Ashburn, VA (US); Carine Todmia, Largo, MD (US)

(73) Assignee: Capital One Services, LLC, McLean, VA (US)

( * ) Notice: Subject to any disclaimer, the term of this patent is extended or adjusted under 35 U.S.C. 154(b) by 106 days.

This patent is subject to a terminal disclaimer.

(21) Appl. No.: 18/048,384

(22) Filed: Oct. 20, 2022

(65) Prior Publication Data

US 2023/0061035 A1 Mar. 2, 2023

Related U.S. Application Data

(63) Continuation of application No. 17/140,811, filed on Jan. 4, 2021, now Pat. No. 11,507,497, which is a
(Continued)

(51) Int. Cl.
G06F 11/36 (2006.01)
G06F 11/34 (2006.01)
(Continued)

(52) U.S. Cl.
CPC ...... *G06F 11/3684* (2013.01); *G06F 11/3438* (2013.01); *G06F 11/3696* (2013.01);
(Continued)

(58) Field of Classification Search
CPC ............ G06F 11/3684; G06F 11/3438; G06F 11/3696; G06F 11/3414; G06F 11/3664;
(Continued)

(56) References Cited

U.S. PATENT DOCUMENTS 6,907,546 B1  6/2005  Haswell et al.
7,454,660 B1  11/2008  Kolb et al.
(Continued)

OTHER PUBLICATIONS

Brian Burg et al., Interactive Record/Replay for Web Application Debugging, Oct. 8-11, 2013, [Retrieved on Oct. 28, 2024]. Retrieved from the internet: <URL: https://dl.acm.org/doi/pdf/10.1145/2501988.2502050> 11 Pages (473-483) (Year: 2013).*
(Continued)

*Primary Examiner* — Anibal Rivera
(74) *Attorney, Agent, or Firm* — Bookoff McAndrews, PLLC

(57) ABSTRACT

According to certain aspects of the disclosure, non-transitory computer readable media, systems and methods are disclosed for creating and executing test scenarios for automated testing of web pages. A computer system, for example, may perform operations including: recording one or more actions performed by a user on a web page, the one or more actions resulting in a web page element being displayed in the web browser application, recording an identifier of the web page element, in response to detecting a user input indicating a selection of the web page element, and recording a characteristic of the web page element; and generating, by the testing extension, a test scenario specifying a testable outcome resulting from the one or more actions, the testable outcome being an occurrence of an element having the identifier and the characteristic.

20 Claims, 10 Drawing Sheets

Related U.S. Application Data continuation of application No. 16/551,316, filed on Aug. 26, 2019, now Pat. No. 10,884,907.

(51) Int. Cl.
- *G06F 16/9535* (2019.01)
- *G06F 16/957* (2019.01)
- *G06F 16/958* (2019.01)
- *G06F 16/954* (2019.01)

(52) U.S. Cl.
CPC ........ *G06F 16/9577* (2019.01); *G06F 16/986* (2019.01); *G06F 11/3414* (2013.01); *G06F 11/3433* (2013.01); *G06F 11/3457* (2013.01); *G06F 11/3664* (2013.01); *G06F 11/3676* (2013.01); *G06F 11/3688* (2013.01); *G06F 11/3692* (2013.01); *G06F 16/954* (2019.01)

(58) Field of Classification Search
CPC ............. G06F 11/3676; G06F 11/3688; G06F 11/3433; G06F 11/3692; G06F 11/3457; G06F 16/986; G06F 16/9577; G06F 16/954; G06F 16/906

See application file for complete search history.

(56) References Cited

U.S. PATENT DOCUMENTS

| | | | |
|---|---|---|---|
| 8,356,282 B1* | 1/2013 | Leippe | G06F 11/3684 717/130 |
| 8,522,083 B1 | 8/2013 | Cohen et al. | |
| 8,701,090 B2 | 4/2014 | Zavatone | |
| 9,317,398 B1 | 4/2016 | Masse et al. | |
| 9,336,126 B1 | 5/2016 | Masse et al. | |
| 9,430,361 B1 | 8/2016 | Masse et al. | |
| 9,507,700 B1 | 11/2016 | Vignet | |
| 10,083,159 B1 | 9/2018 | Bekmambetov et al. | |
| 10,430,212 B1* | 10/2019 | Bekmambetov | G06F 16/958 |
| 10,579,507 B1* | 3/2020 | Lounibos | G06F 3/04842 |
| 2002/0143931 A1* | 10/2002 | Smith | H04L 63/0227 714/E11.193 |
| 2004/0054715 A1 | 3/2004 | Cesario | |
| 2009/0100345 A1 | 4/2009 | Miller | |
| 2009/0249216 A1 | 10/2009 | Charka et al. | |
| 2010/0325615 A1 | 12/2010 | Ramot | |
| 2011/0078663 A1 | 3/2011 | Huang et al. | |
| 2011/0173589 A1 | 7/2011 | Guttman et al. | |
| 2011/0191676 A1 | 8/2011 | Guttman et al. | |
| 2011/0264787 A1 | 10/2011 | Mickens et al. | |
| 2012/0117455 A1 | 5/2012 | Fogel et al. | |
| 2013/0055268 A1 | 2/2013 | Amershi et al. | |
| 2013/0159784 A1* | 6/2013 | Rossi | G06F 11/3684 714/47.1 |
| 2014/0059391 A1 | 2/2014 | Chan et al. | |
| 2014/0089904 A1 | 3/2014 | Wray | |
| 2015/0033331 A1 | 1/2015 | Stern et al. | |
| 2015/0161031 A1 | 6/2015 | Chea et al. | |
| 2015/0169430 A1 | 6/2015 | Deng et al. | |
| 2016/0266730 A1 | 9/2016 | Franke et al. | |
| 2016/0321165 A1 | 11/2016 | Totale et al. | |
| 2017/0019489 A1 | 1/2017 | Churchill | |
| 2017/0185509 A1 | 6/2017 | Arkadyev | |
| 2017/0337122 A1 | 11/2017 | Bolajwar et al. | |
| 2018/0013814 A1 | 1/2018 | Nitsan et al. | |
| 2018/0123934 A1* | 5/2018 | Gissing | H04L 61/301 |
| 2018/0210819 A1* | 7/2018 | Jung | G06F 11/3672 |
| 2018/0219849 A1 | 8/2018 | Jones et al. | |
| 2018/0262404 A1* | 9/2018 | Su | H04L 67/02 |
| 2018/0349602 A1 | 12/2018 | Johns | |
| 2018/0351986 A1 | 12/2018 | Johns | |
| 2019/0235744 A1 | 8/2019 | Burpulis et al. | |
| 2019/0303274 A1* | 10/2019 | Funnell | G06F 11/3696 |
| 2020/0019583 A1 | 1/2020 | Halfond et al. | |
| 2020/0026640 A1 | 1/2020 | Dhanaraj et al. | |
| 2020/0104241 A1* | 4/2020 | Talukdar | G06F 11/3684 |
| 2020/0133829 A1 | 4/2020 | Zazo et al. | |

OTHER PUBLICATIONS

Atif Memon et al., The First Decade of Gu I Ripping: Extensions, Applications, and Broader Impacts, 2013 IEEE, [Retrieved on Sep. 5, 2020]. Retrieved from the internet: <URL: https://ieeexplore.ieee.org/stamp/stamp.jsp?tp=&arnumber=6671275> 10 Pages (11-20) (Year: 2013).

Gari Wassermann et al., Dynamic Test Input Generation for Web Applications, Jul. 20-24, 2008, [Retrieved on Sep. 5, 2020]. Retrieved from the internet: <URL: https://dl.acm.org/doi/pdf/10.1145/1390630.1390661> 11 Pages (249-259) (Year: 2008).

Omar El Ariss et al., A Systematic Capture and Replay Strategy for Testing Complex GUI based Java Applications, 2010 IEEE [ Retrieved on Jun. 8, 2022]. Retrieved from the internet: <URL: https://ieeexplore.ieee.org/stamp/stamp.sp?tp=&arnumber=5501494>6 Pages (1038-1043) (Year: 2010).

* cited by examiner

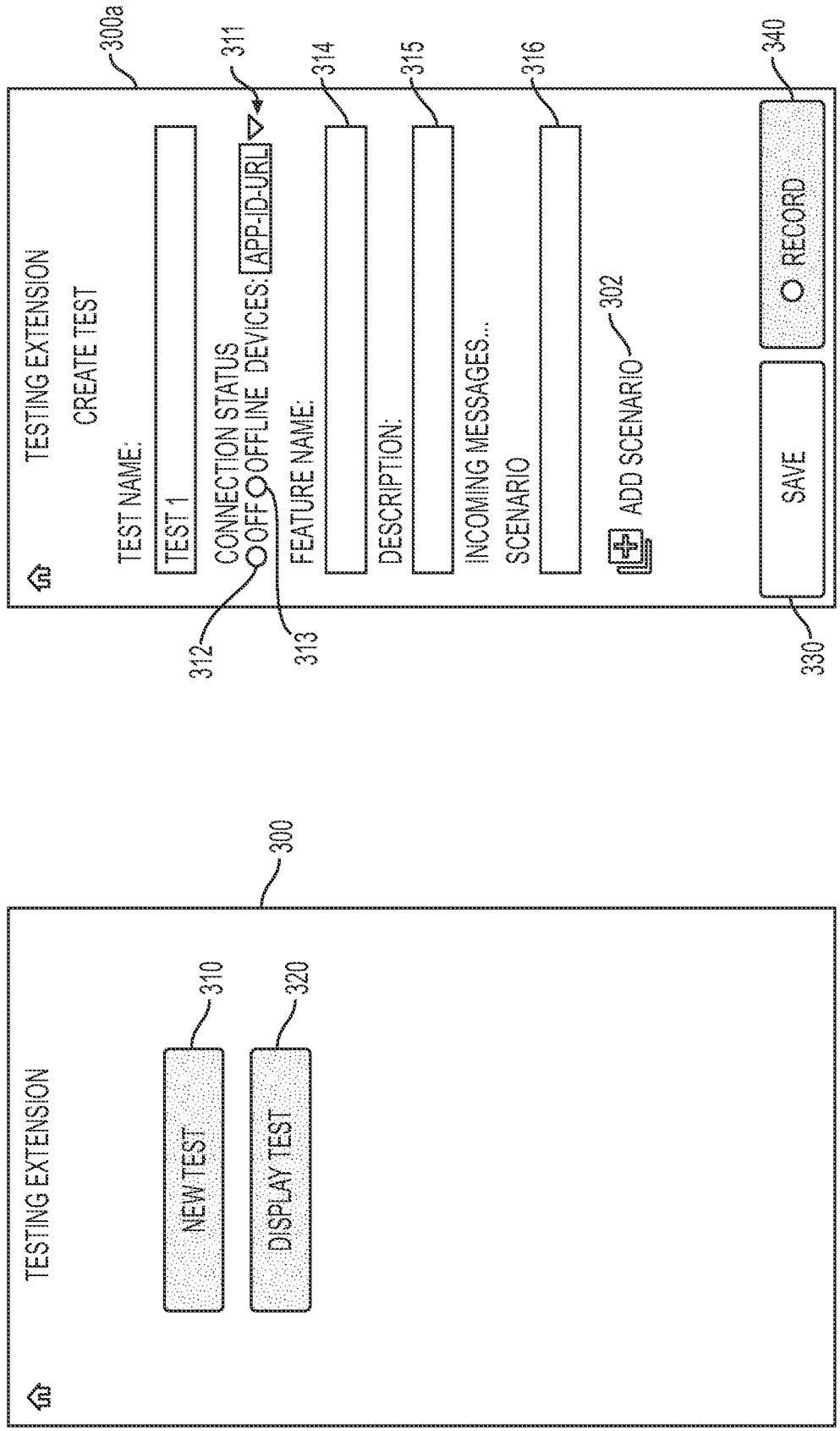

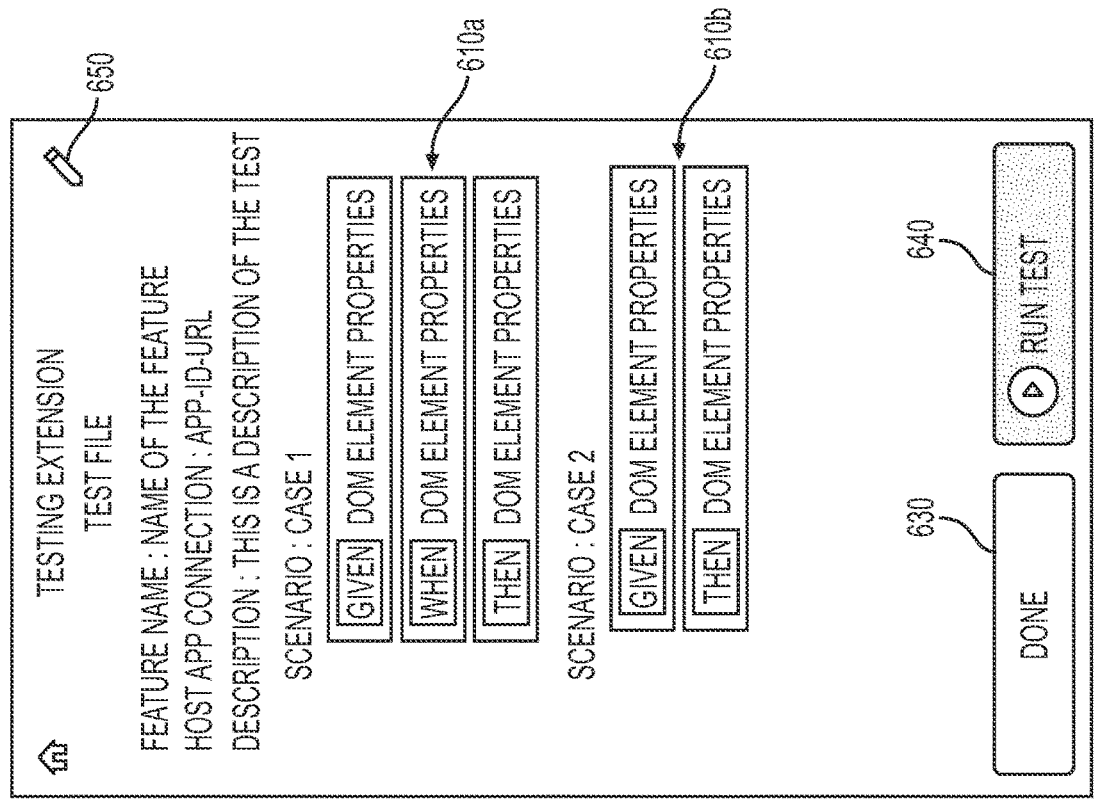
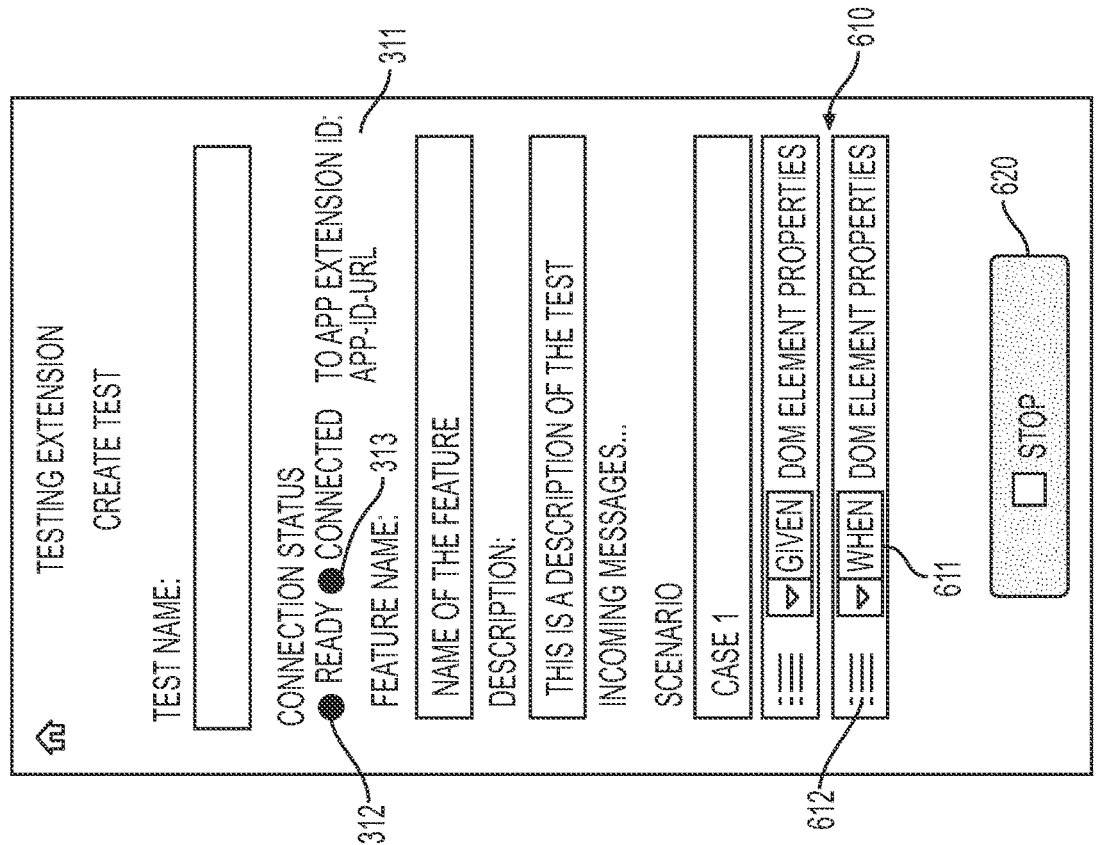
FIG. 6A
FIG. 6B

METHODS AND SYSTEMS FOR AUTOMATED TESTING USING BROWSER EXTENSION

CROSS-REFERENCE TO RELATED APPLICATION(S)

This patent application is a continuation of and claims the benefit of priority to U.S. Nonprovisional patent application Ser. No. 17/140,811, filed on Jan. 4, 2021, now U.S. Pat. No. 11,507,497, which is a continuation of U.S. Nonprovisional patent application Ser. No. 16/551,316, filed on Aug. 26, 2019, now U.S. Pat. No. 10,884,907, the entirety of which is incorporated by reference herein.

TECHNICAL FIELD

Various embodiments of the present disclosure relate generally to automated testing of web pages, and more specifically to automated testing using a browser extension.

BACKGROUND

Traditional frameworks for conducting automated testing of websites and other software features typically require coding experience. Therefore, personnel who are not familiar with coding may find it difficult to use these frameworks. Accordingly, there is a need for methods and systems for creating and executing test scenarios that is more suitable for non-technical personnel. Additionally, it is desirable for such methods and systems to be capable of testing the functionalities of browser extensions.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, non-transitory computer readable media, systems, and methods are disclosed for creating and executing test scenarios for automated testing of web pages. Each of the examples disclosed herein may include one or more of the features described in connection with any of the other disclosed examples.

In one example, a non-transitory computer-readable medium may store instructions that, when executed by one or more processors of a computer system, cause the one or more processors to perform operations. The operations may include displaying a web page in a web browser application executed by the one or more processors, the web browser application having a testing extension. The operations may further include activating, by the testing extension, a recording mode during which user interaction events detected by the web browser application are recorded. Further, the operations may include, while the recording mode is active, recording one or more actions performed by a user on the web page, the one or more actions resulting in a web page element being displayed in the web browser application, recording an identifier of the web page element, in response to detecting a user input indicating a selection of the web page element, and recording a characteristic of the web page element. Additionally, the operations may include generating, by the testing extension, a test scenario specifying a testable outcome resulting from the one or more actions, the testable outcome being an occurrence of an element having the identifier and the characteristic. Still further, the operations may include, in response to a user command to perform execution of the test scenario, executing, using the testing extension, a replication of the one or more actions on a web page to be tested, and determining, using the testing extension, whether the testable outcome resulted from the replication of the one or more actions.

According to another aspect of the disclosure, a computer system may include a memory storing instructions and one or more processors configured to execute the instructions to perform operations. The operations may include displaying a web page in a web browser application executed by the one or more processors, the web browser application having a testing extension. The operations may further include activating, by the testing extension, a recording mode during which user interaction events detected by the web browser application are recorded. Additionally, the operations may include, while the recording mode is active, recording one or more actions performed by a user on the web page, the one or more actions resulting in a web page element being displayed in the web browser application, recording an identifier of the web page element in response to detecting a user input indicating a selection of the web page element, and recording a characteristic of the web page element. The operations may further include generating, by the testing extension, a test scenario specifying a testable outcome resulting from the one or more actions, the testable outcome being an occurrence of an element having the identifier and the characteristic. Additionally, the operations may include, in response to a user command to perform execution of the test scenario, executing, using an automated testing engine, a replication of the one or more actions on the web page using an automated testing application executed by the one or more processors, and determining, using the automated testing engine, whether an element having the identifier and the characteristic resulted from the replication of the one or more actions.

According to another aspect of the disclosure, a computer-implemented method for testing a web application displayed by a web application browser extension may include activating, by the testing extension, a recording mode during which user interaction events detected by the web browser application are recorded. Additionally, the method may include, while the recording mode is active, recording one or more actions performed by a user on one or more web page elements of the web application, the one or more actions causing a web page element to be displayed in the web application as a result of an operation of web application in response to the one or more actions, recording an identifier of the web page element, in response to detecting a user input indicating a selection of the web page element, and recording a characteristic of the web page element. Additionally, the method may include generating, by the testing extension, a test scenario specifying a testable outcome resulting from the one or more action, the testable outcome being an occurrence of an element having the identifier. Further, the method may include, in response to a user command to perform execution of the test scenario, executing a replication of the one or more actions on the one or more web page elements and determining whether an element having the identifier and the characteristic resulted from the replication of the one or more actions.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 3A and 3B illustrate example interfaces for a testing dashboard of a testing extension, according to one or more embodiments.

FIGS. 6A-6F illustrate additional example interfaces for the testing dashboard of the testing extension, according to one or more embodiments.

DETAILED DESCRIPTION

The terminology used in this disclosure is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure provides methods and systems for utilizing a testing extension, such as a browser extension, to record test scenarios on a live website. The testing extension may permit a user to define a test scenario by controlling a web browser application to record actions performed by the user on the live website and record characteristics of elements of the website selected by the user.

Figure 1:
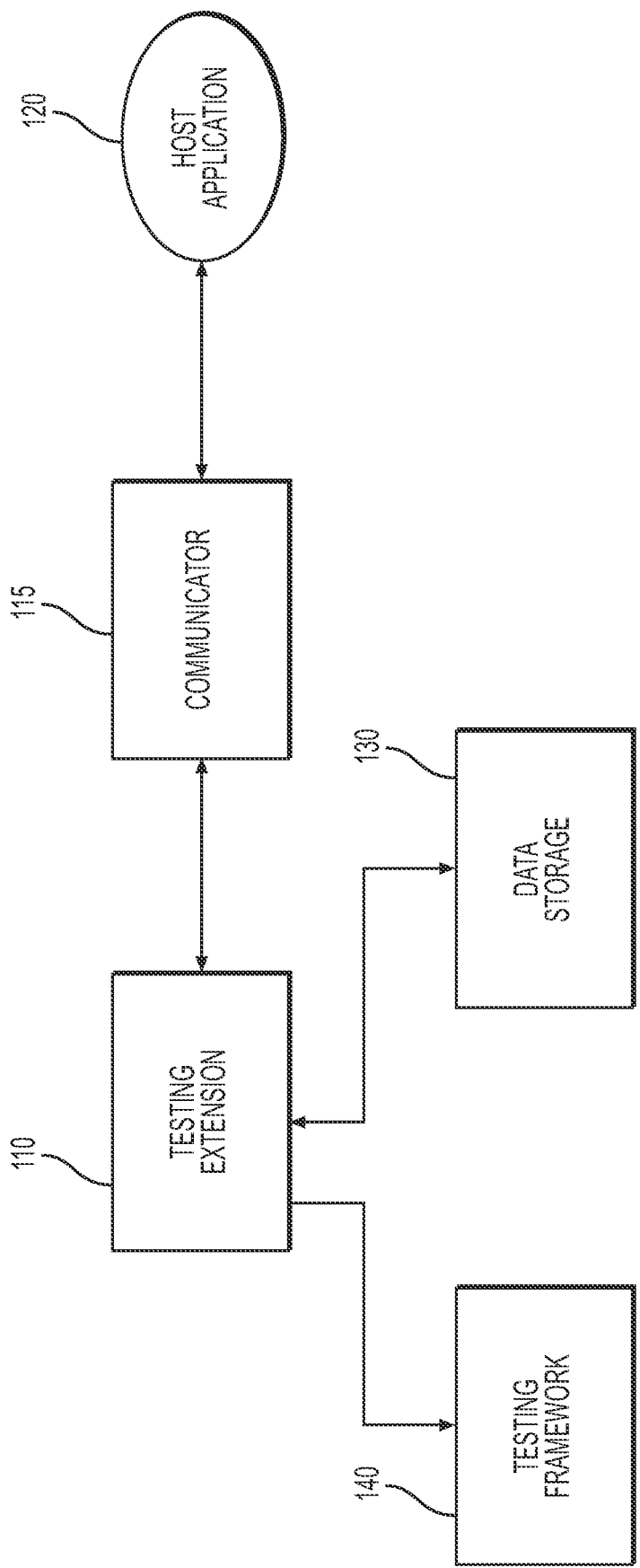
FIG. 1 depicts an application environment, according to one or more embodiments.

FIG. 1 illustrates an application environment according to the present disclosure. The application environment may include a testing extension 110, a communicator 115, a host application 120, a data storage 130, and a testing framework 140.

The host application 120 may be a standalone program in which the testing extension 110 is run. The host application may be executed by one or more processors of a computer or computer system. The host application 120 may also be referred to as a "host app," and the testing extension 110 may also be referred to as a "remote app." The testing extension 110 may be a component that extends, increases, and/or improves the functionalities of the host application 120. Additionally, in this disclosure, any component that is referred to by the term "extension" may also be referred to as a plug-in or add-on. Therefore, the testing extension 110 may also be referred to as a plug-in or add-on of the host application 120.

The communicator 115 may provide an interface by which the testing extension 110 and the host application 120 communicate with one another. For example, the testing extension 110 may send messages to the host application 120 through the communicator 115, in order to request the host application 120 to perform a specified action.

The testing extension 110 may be configured to record test scenarios that can be automatically run (e.g., executed) by an automated testing engine (e.g., test automation engine), which may also be referred to as a test runner. In some arrangements, the testing extension 110 may itself be configured to run the test scenarios, in which case the automated testing engine may be part of and/or included within the testing extension 110 and may utilize functionalities of the host application 120. Alternatively or additionally, a testing framework 140 that is separate from the testing extension 110 may be used to run the test scenarios. In other words, the automated testing engine may be provided by either the testing extension 110, the testing framework 140, or both. Accordingly, as used herein, a "testing extension" is not required to be capable of executing a test scenario unless expressly defined otherwise.

As noted above, the testing framework 140 may be an automated testing framework that includes an automated testing engine configured to run test scenarios recorded and generated by the testing extension 110. The testing framework may include test automation tools such as Selenium, Cucumber, and/or Protractor. According to one possible implementation, the testing framework integrates Cucumber and Selenium. The testing extension 110 may be configured to generate files specifying a test scenario to be run by the testing framework 140.

According to various embodiments of this disclosure, the host application 120 may be a web browser application, and the testing extension 110 may be an extension of the web browser application. A web browser application may be a web browser, such as Chrome, Firefox, Safari, Internet Explorer, or Edge, etc. The communicator 115 may be a JS (JavaScript) communicator 115 used with the web browser application to establish a connection between the testing extension 110 and the web browser application of the host application 120. For example, the testing extension 110 may send a message to the web browser application of the host application 120 through the JS communicator 115 requesting the web browser application to perform one or more operations such as recording events and DOM (document object model) elements. The web browser application of the host application 120 may "listen" to such requests from the testing extension 110 via the JS communicator 115. The web browser application of the host application 120 may return click events and target elements in accordance with the request. The JS communicator 115 may provide the functionality of overcoming cross-site scripting that may be needed to carry out various processes discussed in this disclosure.

Through the JS communicator 115, the testing extension 110 is able to access various aspects of the web browser application of the host application 120. This includes listening to messages between other extensions and websites, in addition to accessing HTML DOM elements of websites loaded in the web browser application of the host application 120. As discussed in more detail below, the testing extension 110 offers a tester the ability to click on an element desired to be tested, and record a validation associated with that element as a part of a test scenario.

The data storage 130 may be a database or file system for collecting, retrieving, and updating test scenarios that are recorded and generated by the testing extension 110. Users may save test scenarios on the data storage 130 together with tags used by various project management tools. In one possible implementation, the data storage 130 may be provided locally, on the same device as the host application 120. In other possible implementations, the data storage 130 is a remote storage or a cloud-based storage. A cloud-based storage may be implemented by, for example, a web service such as Amazon S3, Amazon Elastic Compute Cloud (EC2), and/or Amazon Relational Database Service (RDS), etc.

The data storage 130, particularly if implemented as a remote or cloud-based storage, may be part of a central repository accessible by multiple users. Each user may have an instance of the testing extension 110 installed on a local computing device and may have his or her own account for purposes of tracking which user generated a certain test. A user may generate and run his or her own test scenarios, and may also share the test scenarios or results with other users. Centralized storage and management of test scenarios in such a manner may help facilitate collaboration among users.

The elements of the application environment shown in FIG. 1 may be provided by a single computing device or computer system or by a plurality of computing devices or computer systems. For example, the host application 120, the communicator 115, the testing extension 110, and the testing framework 140 may be locally installed on the same computer computing device or computer system, and the data storage 130 may be provided by at least one other computing device or computer system.

Figure 2A:
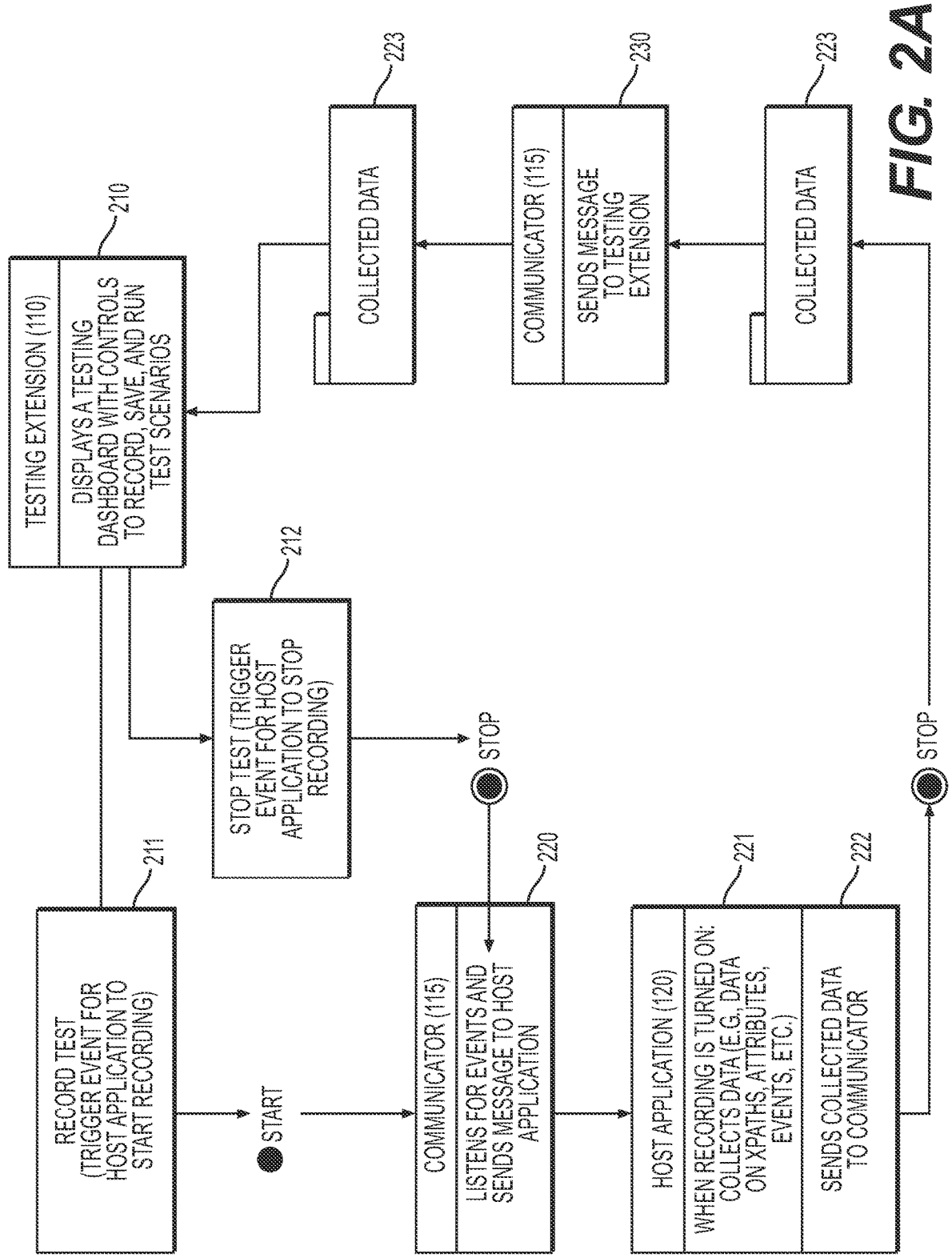
FIGS. 2A and 2B illustrate processes involving the application environment of FIG. 1, according to one or more embodiments.
Figure 2B:
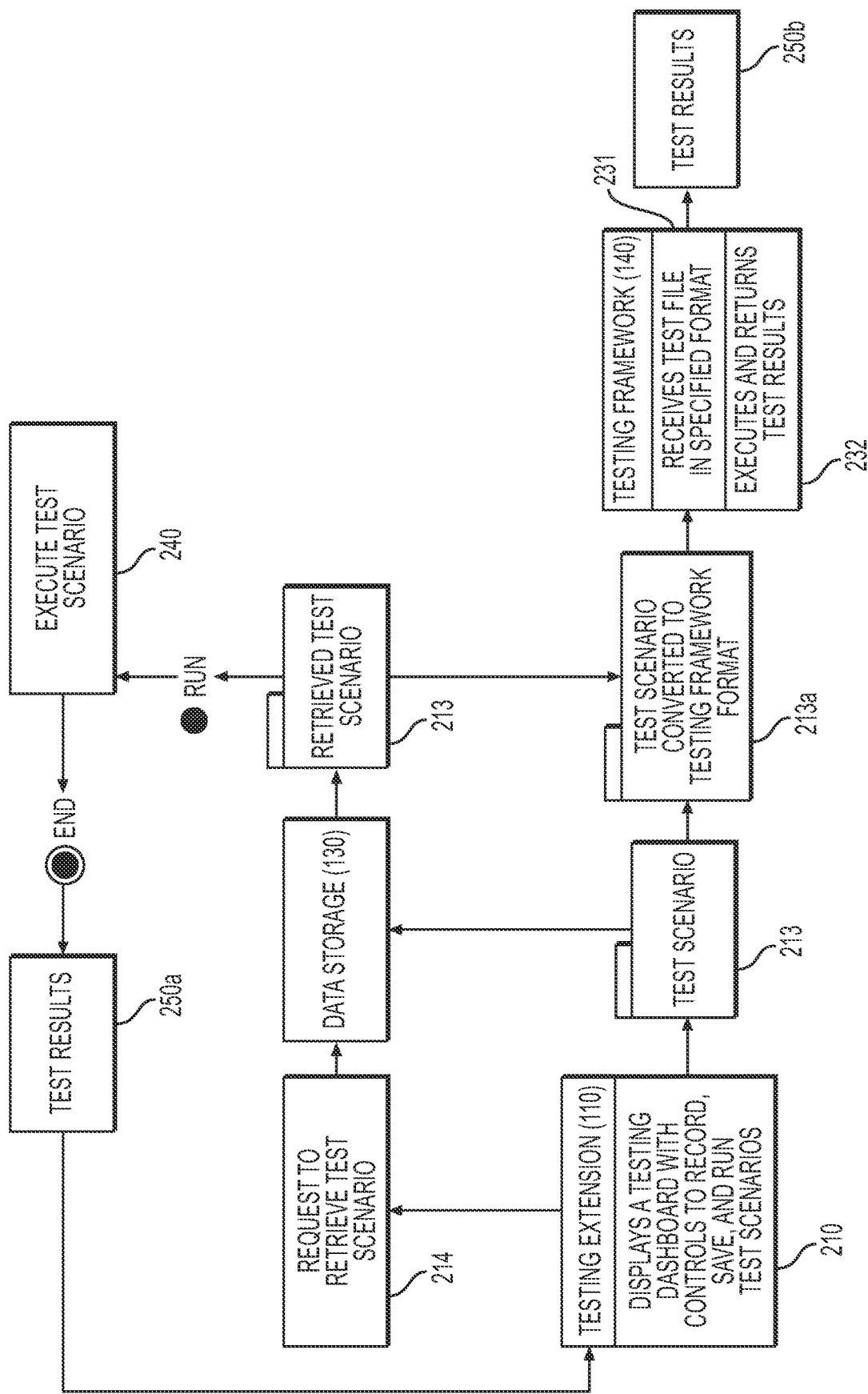

FIGS. 2A and 2B illustrate processes involving the application environment elements illustrated in FIG. 1. As shown in FIGS. 2A and 2B, the testing extension 110 may generate and display a testing dashboard. The testing dashboard may be a graphical user interface or control panel providing controls to record, save, and run test scenarios (step 210). FIG. 2A illustrates processes pertaining to recording a test scenario, while FIG. 2B illustrates processes pertaining to the usage of recorded test scenarios.

Referring to step 211 of FIG. 2A, a user may input a record command through the testing dashboard generated by the testing extension 110, serving as a trigger event for the host application 120 to start (or resume) recording of a test scenario or data used to create the test scenario. The record command may also be used as a trigger by the testing extension 110 to establish a connection with the host application 120. While recording of the test scenario is activated, the user may also input a stop command to the testing dashboard, serving as a trigger event for the host application 120 to stop the recording (step 212 of FIG. 2A).

As indicated in step 220, the communicator 115 may listen for the record or stop command (e.g., events), and relay the record or stop command to the host application 120 by sending a message to the host application 120 requesting the activation or termination of a recording process. The host application 120 then performs the indicated action in response to receiving the message from the communicator 115.

In response to receiving a message requesting activation of the recording process, the host application 120 may collect data describing click events, and DOM elements and their properties (step 221 of FIG. 2A). For example, the web browser application of host application 120 may listen to events occurring on any web page loaded in the web browser application, and collect (e.g., record) data of events and information associated with those events.

An event may be any event detectable by a web browser application. Examples of such events include keyboard events (e.g., key presses to type content into a DOM element that is a text input field), focus events (e.g., when a DOM element receives or loses focus), mouse movement events (e.g., when the mouse hovers over a DOM element), mouse click events (e.g., a mouse click on a DOM element), load events (e.g., when a DOM element is loaded), drag and drop events (e.g., a DOM element is selected and dragged), and any other event detectable by the web browser application involving one or more DOM elements. It is noted that the term "DOM elements" may include the root element (e.g., root node) of an HTML document. The types of events that are listened to and recorded may be specified. For example, the web browser application may be specified to listen to only mouse click and/or key press events.

The aforementioned information associated with an event may further include information describing any DOM elements associated with the event, including the xPath and properties of the DOM elements. A DOM element associated with an event may be a DOM element that a user interacted with during the event, such as a DOM element that is interacted with in the manners described in the above list of event types. For example, if the event is a mouse click on a DOM element, the information associated with the event may include the xPath of the DOM element that was clicked on, along with one or more characteristics of the clicked-on DOM element.

A characteristic of a DOM element may be any property of a DOM element. A property may be a combination of the name and value of a property. A property may include or indicate an attribute, which may be an HTML attribute or a CSS (cascading style sheet) attribute defining a visual appearance of the DOM object, such as color or font size. A characteristic of a DOM element may also be the data of an external content referenced by the DOM element, such as the contents of an image. A characteristic a DOM element may also be the mere presence/existence of the DOM object.

The collected data may include one or more lists of events, one or more lists of DOM elements, and one or more lists of DOM elements and their properties or characteristics. The collected data may be organized so as to maintain association between an event and any DOM elements associated with the event so that when the collected data is received by the testing extension 110, the testing extension 110 or the web browser application of host application 120 is able to determine which particular DOM elements were involved with which particular elements.

The host application 120 may send the collected data 223 to the communicator 115 (step 222). This step may be performed by the host application 120 in response to receiving a message requesting termination of the recording process. Alternatively or additionally, the host application 120 may send the data 223 to communicator 115 in response to other triggers. For example, the host application 120 may send the data 223 to the testing extension 110, via communicator 115, whenever a specified event has occurred, in which case the data may include only data pertaining to that specified event and its associated DOM elements.

In response to receiving the collected data, the communicator 115 may send a message to the testing extension 110 so that the testing extension receives the collected data 223. The message sent by the communicator 115 may include the testing data 223.

Based on the data 223, the testing extension 110 may generate and record a test scenario. The test scenario may be based on only part of the collected data 223. The test scenario may specify one or more testable outcomes, such as the occurrence of a DOM element having a certain characteristic. The test scenario may optionally specify one or more preconditions (e.g., initial states) for execution the test scenario, and/or one or more actions to be taken during execution of the test scenario.

A precondition of the test scenario may be presence of a DOM element having a specified xPath and property. An action of the test scenario may be an action, specified by an event, that is to be performed on a DOM element having a specified xPath. A testable outcome of the test scenario may be an occurrence of a DOM element having a specified xPath and property as a result of the event. As will be discussed in greater detail later in this disclosure, any preconditions, actions, and testable outcomes may be defined by a user through the testing dashboard of the testing extension. Specifically, the recording process performed by the host application 120 may be used to return the xPath and DOM element properties that are used to specify a precondition, action, or testable outcome of the test scenario.

The format of the data specifying the test scenario may be different from that of the data 223 collected by the host application 120. For example, the data specifying the test scenario may include a hash of part of the data 223 collected by the host application 120.

Referring now to FIG. 2B, after the test scenario has been recorded (as a recorded test scenario 213), the testing dashboard may enable the user to save the recorded test scenario 213 in the data storage 130. Through the dashboard, the user may also load the recorded test scenario 213 from the data storage 130. For example, if the data storage 130 is a remote storage (e.g., a cloud storage), the testing extension 110 may transmit a request to retrieve the test scenario (step 214). Once a recorded test scenario 213 is retrieved, the test scenario 213 may be executed by the testing extension 110 (step 240) by using an automated testing engine included in, or implemented by, the testing extension 110. The results 250a of the execution of the recorded test scenario 213 may be displayed by the testing extension 110.

To execute the recorded test scenario 213, the testing extension 110 may use browser extension APIs (application programming interfaces) to control a page and run through steps or events defined by the recorded test scenario 213.

Test results 250a may also be obtained using the testing framework 140. In this case, the testing extension 110 may convert the recorded test scenario 213 into a test scenario 213a converted into specified format that usable by the testing framework 140. The test scenario 213a is then sent to the testing framework 140, which, in response to receiving the test file (step 231), executes the test scenario 213a and returns the test results 250b (step 232). The test results 250b may be sent back to the testing extension 110 during executing of the test scenario or afterwards for display by the testing extension 110.

It is noted that in the processes shown in FIGS. 2A and 2B, the recorded test scenario 213 may be generated and stored as part of a larger element, such as a test comprising multiple recorded test scenarios and other elements.

FIGS. 3A and 3B illustrate an example of the testing dashboard 300 generated by the testing extension 110. As shown in FIG. 3A, the testing dashboard 300 may include a button 310 to create a new test, and a button 320 to display an existing test.

Activating the button 310 may display a dashboard interface 300a for creating a test. Interface 300a may include a device link input field 311, which is a text input field and/or a selection menu to input or select an identifier of a device to connect to. This identifier may be the identifier (ID) of another extension of the web browser application that is to be tested, and may be specified to enable the testing extension 110 to listen to messages between the web browser application (of host application 120) and the browser extension that is to be tested. The ID may include a URL.

The interface 300a may further include a first status indicator 312 indicating whether the testing extension 110 is currently in a recording mode, and a second status indicator 313 indicating whether the web browser application is currently connected to a "device" (such as the browser extension that is to be tested). The interface 300a may further include text input fields 314, 315, and 316 enabling the user to input a name of the feature, a description of the test, and a name of a scenario, respectively. These fields 314, 315, 316 may be used for commenting or project management purposes, and their contents need not play any role in the actual execution of the test scenario. The interface 300a may further include user interaction elements 302, 330, and 340 enabling the user to add a scenario with the name specified in text input field 316, save the current test, and record a test scenario for the test, respectively.

In the example shown in FIG. 3B, the test denoted as "test 1" may include data of all of the fields shown in the interface 300a, as well as data defining any test scenarios of the test. A test scenario may be saved as a component of a test, which may include multiple test scenarios.

Figure 4A:
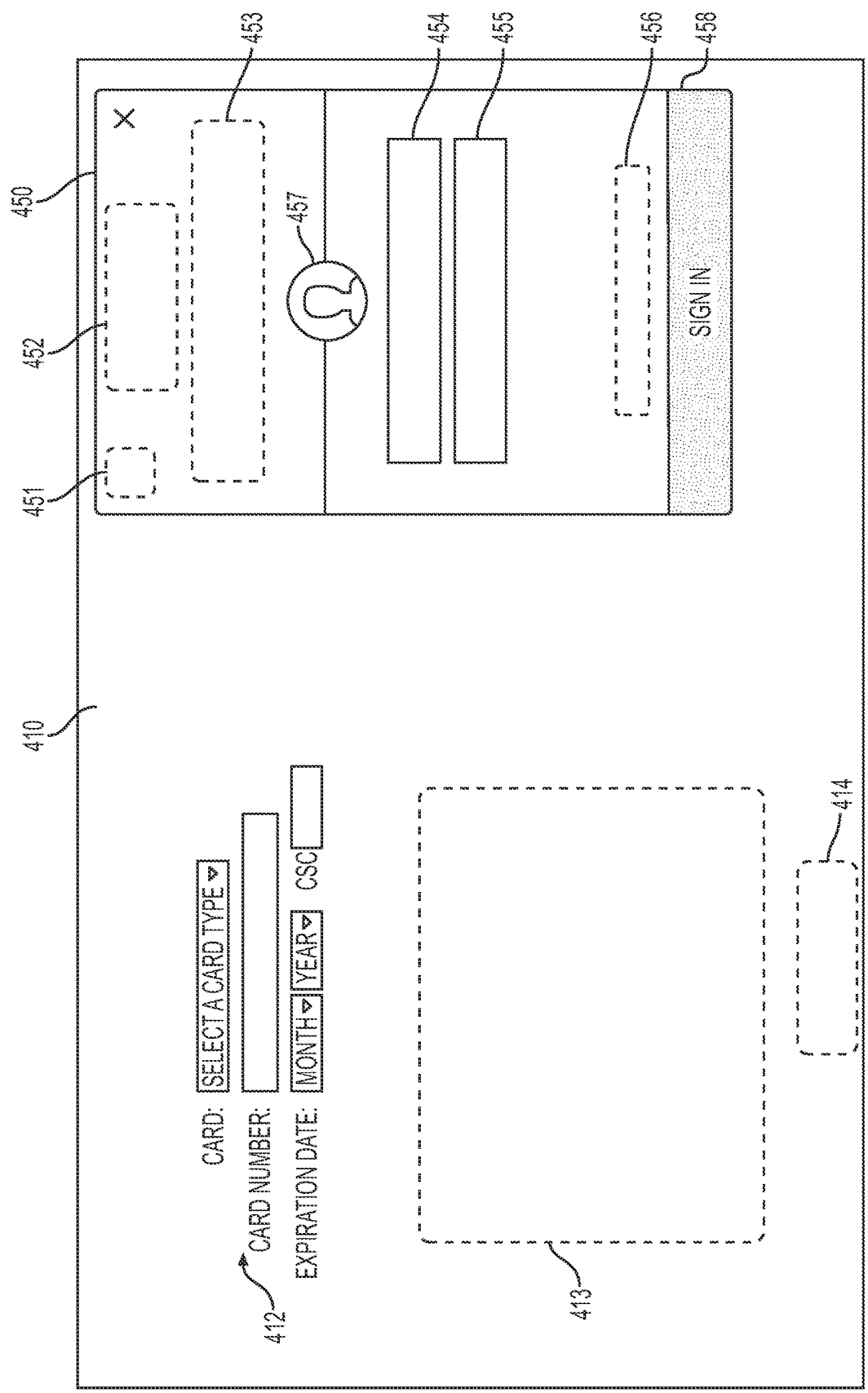
FIGS. 4A and 4B illustrate examples of web pages that may be tested according to methods and systems of the present disclosure.
Figure 4B:
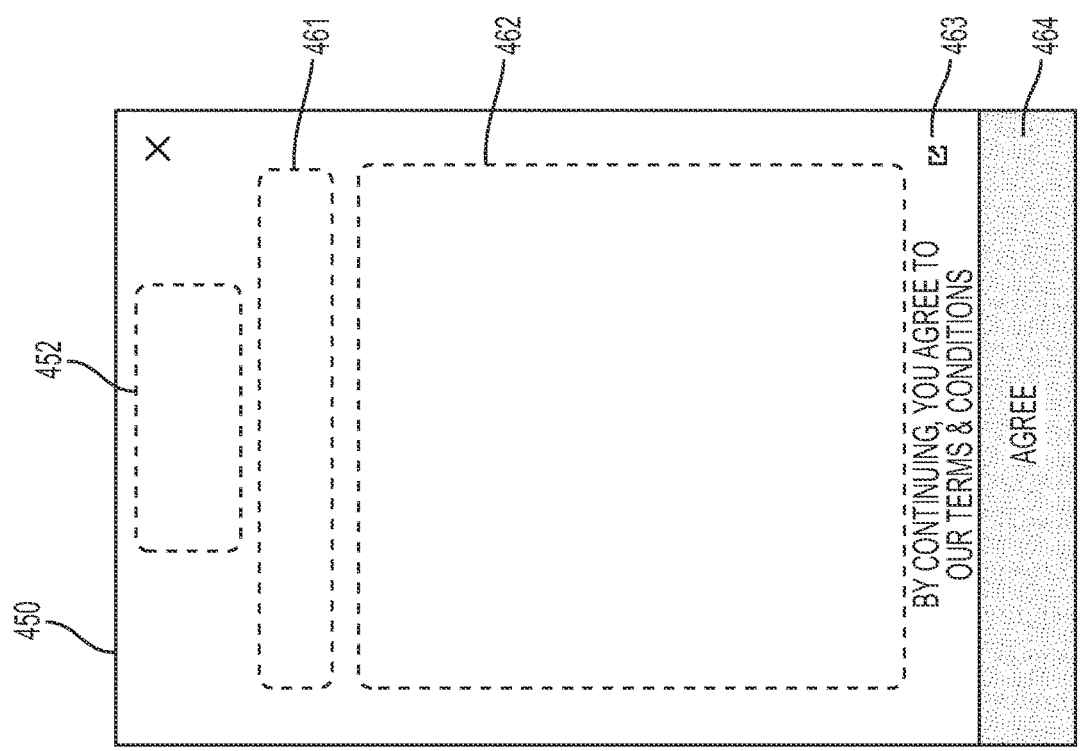

FIGS. 4A-4B illustrate examples of web pages that may be tested according to the methods and systems of the present disclosure. FIG. 4A is a view of a web browser screen of the web browser application (host application 120). In FIG. 4A, the web browser screen is displaying, among other things, a first web page 410 that is loaded in the web browser application (host application 120). In this particular example, the web page 410 may be part of a merchant website operated by a merchant, and may include a form 412 containing various fields for a user to input credit card information, an address form 413, and a button 414 for submitting the entered information.

As shown, the web browser screen may also display a web page interface 450 generated by a second browser extension of the web browser application. The web page interface 450 may also be referred to as a web page, and may be generated by the second browser extension based on data received by the second browser extension from a web resource such as a server. For example, the second browser extension may be a browser extension for using a service that provides a virtual credit card number to be used to purchase an item from the merchant website. In order to provide usage of the service, the second browser extension may communicate with a server of a credit card issuer, such as a bank. One or more screens of the web page interface 450 may include, or be based on, data (e.g., HTML code) received from the server.

In the example shown in FIG. 4A, the web page interface 450 generated by the second browser extension may include a login screen comprising a logo 452, a heading 453, an image 457, a username input field 454, a password input field 455, and a sign-in user button 458. The screen may additionally contain other elements 451 and 456, as desired or needed. Upon inputting a username and password of a valid user account and then selecting the "sign-in" button 458, the second browser extension submits the login information to the server of the credit card issuer. In response to receiving the login information, the server of the credit card issuer may then transmit data to the second browser extension to display the post-sign-in screen shown in FIG. 4B. This data may be, for example, an HTML document for the post-sign-in screen or data instructing the second browser extension to display the screen. The post-sign-in screen may include a heading 461, text 462, a statement 463 regarding terms and conditions, and an "agree" button 464 used to proceed with the virtual credit card number service.

In the instant example, the web page interface 450 generated by the second browser extension may be a floating interface overlaying the web page 410 on the web browser screen. The web page interface 450 may automatically pop up and as a result of a user interaction performed on the first web page 410. This user interaction may, for example, be a click or a mouse hover performed on the "card number" text input field or some other element or portion of the form 312, or the activation of a button or link on the web page 410 that caused the form 312 to be displayed in response to the activation. The second browser extension may have a listener to detect this user interaction, and display the log-in screen as a pop-up in response to the user interaction.

The testing dashboard 300 shown in FIG. 3A, along with its interfaces, may be displayed on the browser screen shown in FIG. 4A (e.g., as a container overlaying the web page 410), or in its own tab or window.

Figure 5:
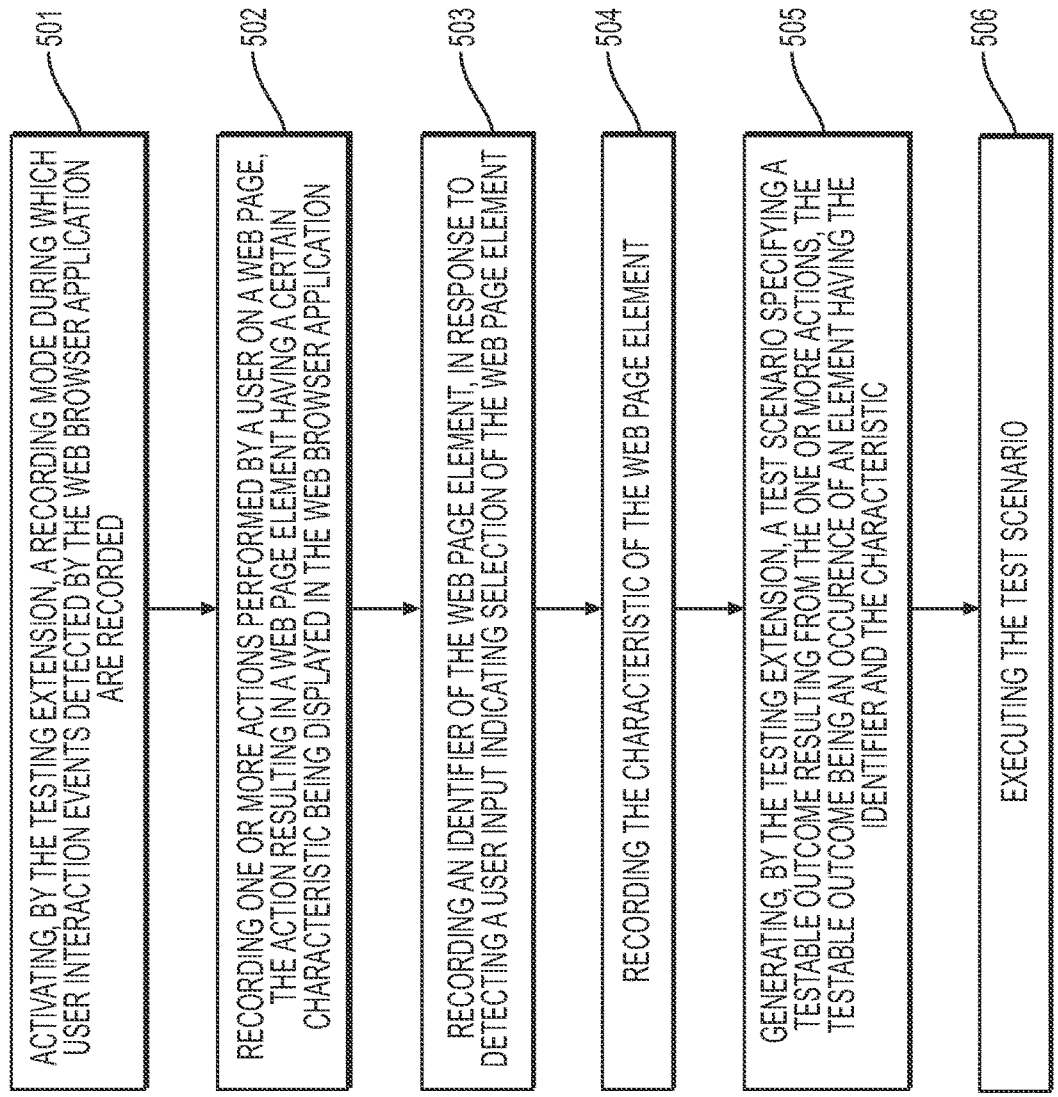
FIG. 5 illustrates a method of creating and executing a test scenario, according to one or more embodiments.

FIG. 5 is a flowchart for a process for recording a test scenario. The process may be performed by one or more processors of a computer system. The process of FIG. 5 may include activating, by the testing extension, a recording mode during which user interaction events detected by the web browser application are recorded (step 501).

The activating the recording mode may be performed in response to a record command received from a user. As discussed above, the record command may be received through a testing dashboard interface of the testing extension 110. The step of activating the recording mode may comprise sending a record command to the web browser application (host application 120), according to steps 211 and 202 of FIG. 2A. The web browser application (host application 120), in response to receiving the command, initiates a process of detecting events and recording events that are detected, along with associated DOM elements. The types of events that the web browser application is to detect and record may be specified by a configuration setting, and may for example, be limited to user interaction events such as click events and key press events.

The process shown in FIG. 5 further includes: recording one or more actions performed by a user on a web page, the action resulting in a web page element having a characteristic being displayed in the web browser application (host application 120) (step 502); recording an identifier of the web page element, in response to detecting a user input indicating selection of the web page element (step 503); recording the characteristic of the web page element (step 504); and generating, by the testing extension, a test scenario specifying a testable outcome resulting from the one or more actions, the testable outcome being an occurrence of an element having the identifier and the characteristic (step 505).

As a first example for illustrating these steps of FIG. 5, the "web page" in step 502 may be the web page 410 shown in FIG. 4A. The user may perform an action on the web page 410 triggering the web page interface 450 to appear on the screen of the web browser application (host application 120). The triggering action may, for example, be one of the actions discussed earlier. The "web page element" in step 502, which is displayed in response to the user action, may be the web page interface 450 or any element within web page interface 450. For example, the web page element may be the image 457 and the characteristic of this element may be or represent image data of the image. The web page element may also be the sign-in button 458 and the characteristic of this element may be a green color of the sign-in button, which may be a characteristic defined by a DOM attribute.

Therefore, in the above example, a process of triggering the web page interface 450 is recorded. The recorded information may subsequently be used to generate a test scenario designed to test whether the web page interface 450 is properly triggered and properly displayed as a result of a user action on website 410.

As a second example, the "web page" in step 502 may be the web page interface 450 generated by the second browser extension. The user may perform a sequence of actions comprising inputting a username into field 454, inputting a password into field 455, and clicking the sign-in button 458. This sequence of actions results in the loading and display of the post-sign-in screen shown in FIG. 4B. Accordingly, the "web page element" in step 502 may be any element of the post-sign in screen of FIG. 4B. For example, the web page element may be a DOM element containing the text "by continuing, you agree to our terms & conditions," as shown in FIG. 4B.

Therefore, in the second example, a process of using the web page interface 450 is recorded. The recorded information may be subsequently used to generate a test scenario 213 used to test whether the second browser extension is operating as intended.

In step 502, the recording of each action among the one or more actions performed on the web page may include recording an event and information describing the DOM element(s) associated with the event, as discussed above for FIG. 2A. An action may include a combination of an event and an identifier that the user element interacted with during the event. For example, in the second example discussed above, the web browser application may record the key presses used to type the username into field 454, the key presses used to type the password into field 455, and the mouse click on sign-in button 458 as events. The web browser application may further record the xPath of the field 454, the xPath of field 455, and the xPath of sign-in button 458. The xPath of these elements may be recorded so that it is possible to identify the elements for automated interaction with the elements when the test scenario is run.

In step 503, the input indicating selection of the web page element may be performed by a user to identify the web page element so that the web page element can be added to the test scenario as an element to be validated when the test scenario is run. The selection of the web page element may be performed by selecting the web page element on a browser screen, which, accordingly, may be a WYSIWYG ("what you see is what you get") interface.

The user input in step 503 may be a mouse click to select the web page element, in which case the mouse click may be recognized and recorded by the web browser application as an event, in the same manner that the one or more actions in step 502 includes an event. Events corresponding to a user inputs intended to define an action of the test scenario (e.g., an event of the one or more actions in step 502) may be distinguished from events corresponding to user inputs intended to define an outcome of the test scenario (e.g., an event of the user input selecting the web page element) by an automatic procedure, a manual procedure, or a combination of automatic and manual procedures.

For example, events that occur when defining an action of the test scenario may be automatically distinguished from events that occur when defining an outcome of the test scenario automatically based on the type of element (e.g., whether the element is a static element rather than an interactive element used to submit data or trigger another event), the type of interaction, and/or some other context. It is also possible for a user to manually select whether an interaction is to be recorded as an input action or a selection of a feature. For example, when a user clicks on an element, which may be an interactive element, the user may be prompted to select whether the click is to be processed as an input action performed on to the web page, or instead as an identification of a feature for validation.

In step 503, the identifier of the web page element may be the xPath of the DOM element corresponding to the web page element.

In step 504, a characteristic of the web page element is recorded, and, in step 505, the recorded characteristic is used to define a testable outcome of the test scenario. It is noted that a web page element (e.g., a DOM element) may have many characteristics, such as color, font-size, container size etc. Therefore, the web browser application (host application 120) may record a plurality of characteristics of the DOM element (in performing steps 221, 222, and 230 shown in FIG. 2A) and transmit the plurality of characteristic to the testing extension 110. The testing extension 110 may then provide a selection interface to the user to select one or a subset among the plurality of characteristics of the DOM element. Alternatively, or additionally, the web browser application (host application 120) may prompt the user to select one or a subset of the plurality of characteristic of the DOM element to be recorded as part of step 221 of FIG. 2A.

FIGS. 6A and 6B illustrate the testing dashboard during and after recording of the test scenario, respectively. In this example the test scenario is labeled "case 1." As shown in FIG. 6A, during the recording of the test scenario, the testing dashboard may display a list of recorded steps in a step list 610. The steps may be displayed in the step list 610 in the order of execution when the test scenario is run. Each step may be defined by a step keyword and a definition of the step (including DOM element properties used to define the step).

The step keyword indicates a step type, such as whether the step is a precondition (initial state) of the test scenario, an action to be performed when the test scenario is run, or a testable outcome. The step keyword may, for example, be a Gherkin keyword such as "given", "when," "then," "and," or "but." Steps labeled with the "given" keyword define a precondition of the test scenario. Steps labeled with the "when" keyword define an action to be performed during the test. Steps labeled with the "then" keyword define a testable outcome resulting from the actions to be performed during the test. Steps may also be labeled by "and" and "but," as used in Gherkin. For example, "and" indicates a conjunction with the previously listed step. The step list 610 may include interface elements 611 to adjust the type of step.

Using the "second example" discussed above for testing the interface 450 of the second browser extension, the test file interface of the testing dashboard may be represented as a scenario having the following steps: a step marked by keyword "when" and indicating an action of inputting a username into a field having an xPath used to identify field 454 of FIG. 4A; a subsequent step marked by keyword "and" indicating an action of inputting a password into a field having an xPath used to identify field 455 of FIG. 4A; a subsequent step marked by keyword "and" indicating a click on the sign-in button 458, and a subsequent step marked by keyword "then" indicating an element containing the text "by continuing, you agree to our terms & conditions," as shown in FIG. 4B.

The keyword or step type may be automatically assigned by the testing extension and/or manually selected through the testing dashboard. For example, the keyword may initially have a blank or default value, and the user may assign the keyword as the user records the test scenario using a selection list. For example, a step may be added to the list every time an event is detected by the web browser application (in accordance with step 221 of FIG. 2A), and the user may then specify the step type by selecting one of the keywords from a drop-down menu 611.

The precondition of the test scenario may be automatically defined by the testing extension 110. For example, the testing extension may automatically record the URL of the web page on which the initial user interaction is performed. Alternatively or additionally, a user may record the precondition in the manner of steps 503 and 504 of FIG. 5. That is, the user may select a DOM element on a web page (which may be the entire document), and select the document URL as the characteristic of this DOM element. Upon doing so, a step may appear in step list 610, and the user may designate the step as a precondition by selecting the keyword "given."

Precondition steps may be optional, and may be omitted from the test scenario. For example, the user may navigate to a certain web page and run the test scenario on that website. In such a usage, it is not necessary for preconditions to be defined. Similarly, action steps may be optional. For example, if there are neither precondition steps nor action steps, the execution of the test scenario may simply validate whether a current display of the web browser application (host application 120) includes a DOM element having the identifier and characteristic specified in the testable outcome.

The sequence of steps in the step list 610 may be the sequence as recorded. However, the step list 610 may include and interface elements 611 to adjust the order of steps. The step definitions may be automatically generated. However, the user may edit the definition of each step, such as the selection of the DOM element and its DOM element properties to be validated during execution of the test scenario.

As shown in FIG. 6A, the user may click a user interaction element 620 to stop recording of the test. FIG. 6B shows an example of a test file interface testing dashboard after having recorded and generated two test scenarios. As shown, the testing dashboard shows a step list 610*a* for the test scenario "case 1" and another step list 610*b* for the test scenario "case 2."

In the interface shown in FIG. 6B, the user may click a button 630 to return to a another interface, such as the interface shown in FIG. 3A. The user may also click on a button 650 to edit the test, thereby opening the edit test interface shown in FIG. 6C. The edit test interface shown in FIG. 6C permits the user to edit the test, save the test and record additional scenarios for the test. The button 340 may be used to record additional test scenarios or test scenario steps for the test that is being edited.

The process shown in FIG. 5 further includes executing the test scenario (step 506). This step may include executing a replication of the one or more actions on a web page to be tested, and determining whether the testable outcome resulted from the replication of the one or more actions. The processes of executing the test scenario and evaluating the results may be performed by the testing extension 110 or by the testing framework 140 that is external to the testing extension 110, as shown in FIG. 2B.

For example, a test scenario may have a precondition, an action, and a testable outcome. To validate a precondition of the test scenario, the testing extension 110 or testing framework 140 may determine whether a current web page loaded in the web browser application (host application 120) includes a DOM element having the xPath and property specified by the precondition. If such a DOM element exist, then the precondition is validated. Next, the testing extension 110 or testing framework 140 may perform the action of the test scenario by finding a DOM element having a specified xPath, and performing the event on that DOM element specified by the action. If such a DOM element exists, and the event is performable, then the action is validated. Finally, to test the testable outcome, the testing extension 110 or testing framework 140 may determine whether any current web page loaded in the web browser application (at a time subsequent to the action) includes a DOM element having the xPath and property specified by the precondition. If such a DOM element exist, then the testable outcome is validated.

Figure 6D:
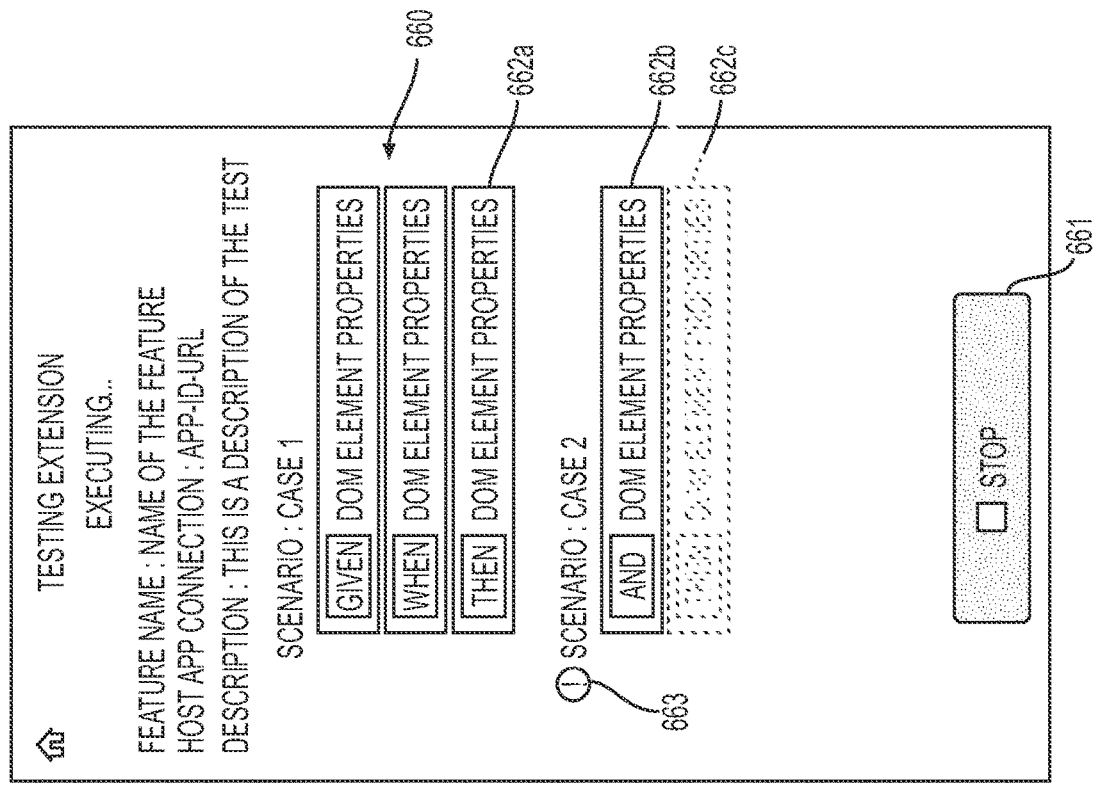
Figure 6C:
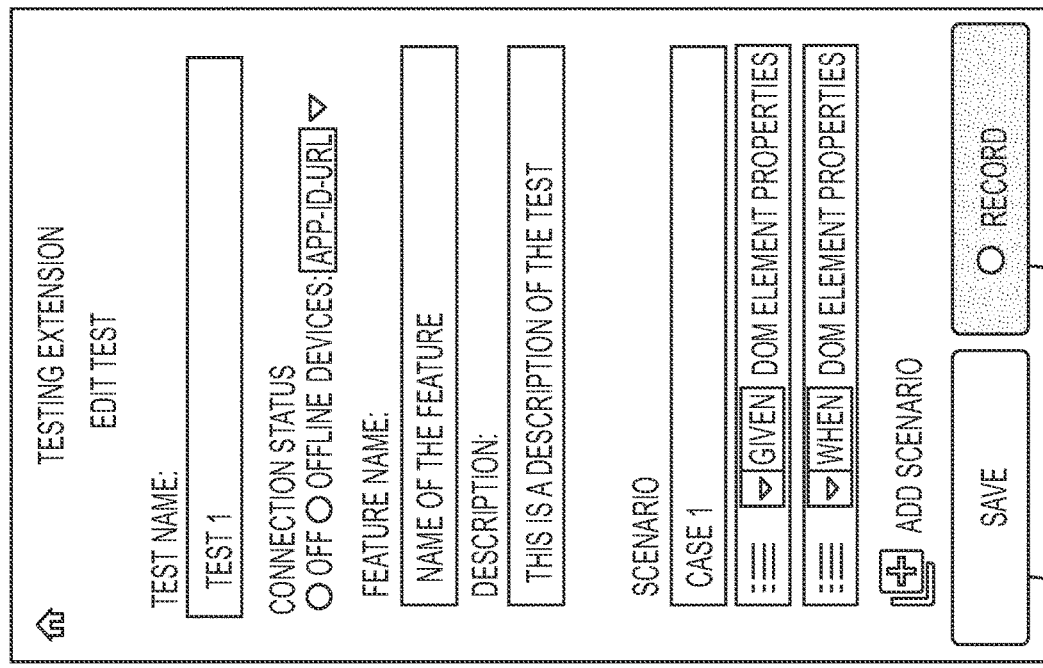
Figure 6F:
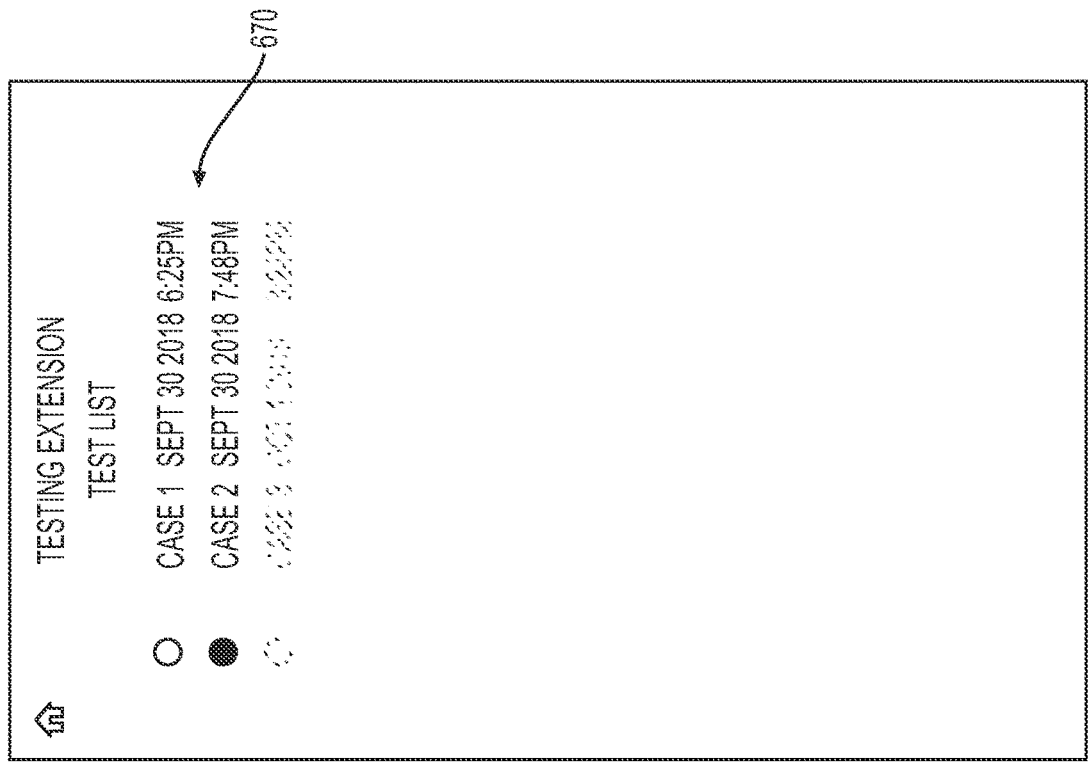
Figure 6E:
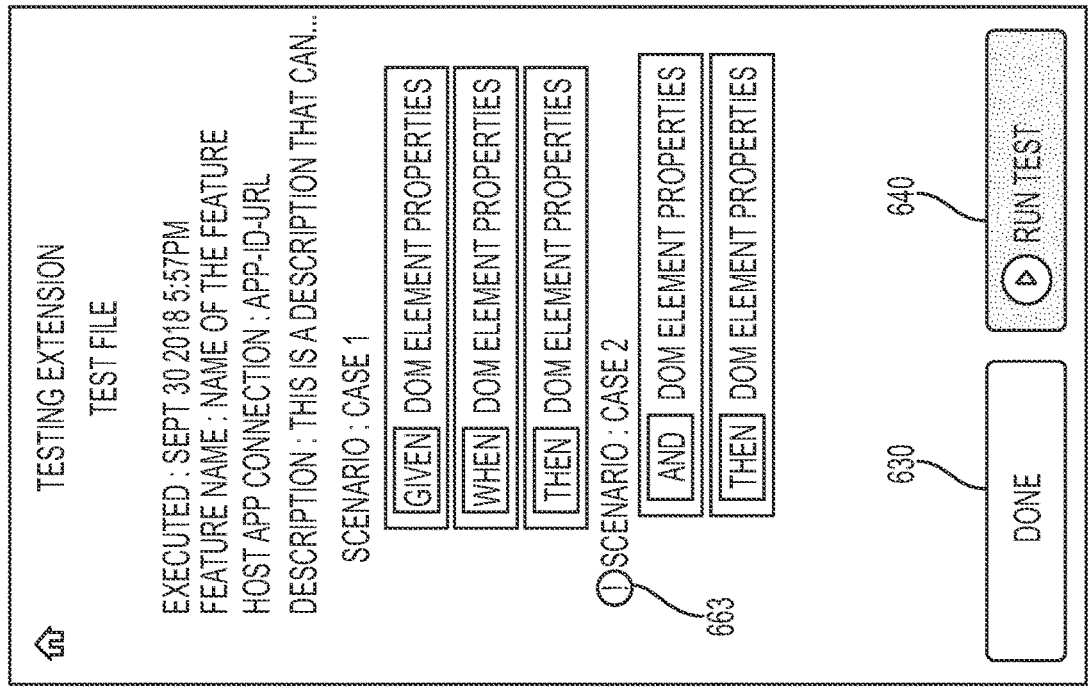

FIGS. 6D-6F illustrate interfaces of the testing dashboard related to execution of a test scenario. FIG. 6D shows a display of the testing dashboard during execution of the test. The testing dashboard may distinguish steps that have been run (e.g., steps 622*a*, 622*b*) and steps that have not been run (e.g., step 662*c*) by displaying the latter in a different visual manner (e.g., in a faded manner). Additionally, among steps that have been run, those that were successfully validated and those that were not successfully validated may be marked in different visual manner (e.g., different colors, such as of green and red, for successful and unsuccessful results, respectfully). Additionally, if there is any step in a test scenario that did not validate successfully, the testing dashboard may display a marker 663 indicating a failed test.

FIG. 6E shows the testing dashboard upon completion of the test. FIG. 6F displays a summary list 670 of multiple test scenarios of the test, including an indicator of whether the test scenario was successful, was not successful, or has not yet been run, as well as the dates and times of the latest execution of the test scenarios.

The testing extension 110 may provide the functionality of taking screenshots of failed or successful test scenarios, manually or automatically. Screenshots may be saved on the data storage 130.

The interfaces shown in FIGS. 6D-6F may be generated whether the processes of executing the test scenario and evaluating the results is performed by the testing extension 110 or by the testing framework 140. If the processes are performed by the testing framework, the testing framework may supply results at the end of the execution of the test, and/or during the execution of the test.

Accordingly, various embodiments of this disclosure provide a testing extension permitting users to record, save, and run test scenarios through a graphical user interface, without the need for coding, thereby allowing non-technical personnel to more easily become involved with the testing of websites. As discussed above, components of the test scenario (precondition, action, and testable outcome) may be defined based on selection of web page elements in a web browser. In particular, an action of the test scenario may be recorded on a live website. Additionally, the testing extension may have the ability to connect to other browser extensions, to thereby provide automated testing of browser extensions as well as testing of typical websites.

In general, any process discussed in this disclosure that is understood to be performable by a computer may be performed by one or more processors. Such processes include, but are not limited to: the processes shown in FIGS. 2A-2B and 5; processes involving operations of the testing extension 110, the communicator 115, the host application 120, and the testing framework 140; the generation of a user interface described in this disclosure; and processes involving data processing, storage, or analysis. The one or more processors may be configured to perform such processes by having access to instructions (computer-readable code) that, when executed by the one or more processors, cause the one or more processors to perform the processes. The instructions may also be stored on a non-transitory computer-readable medium.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method, comprising:
   recording, by one or more processors, one or more actions performed by a user on one or more web page elements of a web application output on a display, for each action of the one or more actions:
      recording, by the one or more processors, a respective identifier of a web page element corresponding to the action;
      recording, by the one or more processors, a characteristic of the web page element; and
      generating, by the one or more processors, one or more steps based on the action, the respective identifier, and the characteristic;
   generating, by the one or more processors, a first test scenario specifying a testable outcome resulting from the one or more actions, the testable outcome including an occurrence of the web page element having the respective identifier and the characteristic;
   recording, by the one or more processors, one or more further actions performed by the user on the first test scenario;
   generating a second test scenario based on the first test scenario as modified by the one or more further actions, the second scenario comprising one or more step lists, the one or more step lists including the one or more steps generated for the one or more further actions; and
   causing the display to output the second test scenario, the first test scenario, and the second test scenario comprising different step lists.

2. The computer-implemented method of claim 1, wherein the one or more actions include one or more of a keyboard event, a focus event, a mouse movement event, a mouse click event, a load event, or a drag and drop event.

3. The computer-implemented method of claim 1, further comprising:
   identifying each recorded step as a step type, the step type indicated by a step keyword associated with each recorded step.

4. The computer-implemented method of claim 3, wherein the step type is identified from a group of possible step types associated with step keywords including "given", "when," "then," "and," and "but".

5. The computer-implemented method of claim 3, wherein the step type for each recorded step is identified automatically upon the detecting of the one or more actions performed by the user on one or more web page elements of a web application.

6. The computer-implemented method of claim 3, wherein a testing dashboard includes one or more interactive elements that is selectable by the user to manually set the step type for each recorded step.

7. The computer-implemented method of claim 3, further comprising:
   activating a test scenario editing interface, the test scenario editing interface displaying one or more step lists associated with at least one test scenario;
   receiving, via the test scenario editing interface, a manual assignment of a step keyword to one or more of the recorded steps from the user;
   modifying the one or more step lists based on the received manual assignment; and
   updating the at least one test scenario based on the modifying of the one or more step lists.

8. The computer-implemented method of claim 1, wherein the output of the display includes a visual indication of one or more of run status or validation status.

9. The computer-implemented method of claim 1, wherein the web application is a live website.

10. The computer-implemented method of claim 1, wherein the first test scenario specifies one or more preconditions for execution.

11. A computer system comprising:
    a memory storing instructions; and
    one or more processors configured to execute the instructions to perform operations including:
       recording, by one or more processors, one or more actions performed by a user on one or more web page elements of a web application output on a display, for each action of the one or more actions:
          recording, by the one or more processors, a respective identifier of a web page element corresponding to the action;
          recording, by the one or more processors, a characteristic of the web page element; and
          generating, by the one or more processors, one or more steps based on the action, the respective identifier, and the characteristic;
       generating, by the one or more processors, a first test scenario specifying a testable outcome resulting from the one or more actions, the first test scenario comprising one or more step lists, the one or more step lists including the one or more steps generated for the one or more actions;
       recording one or more further actions performed by the user on the first test scenario;
       generating a second test scenario based on the first test scenario as modified by the one or more further actions, the second scenario comprising one or more step lists, the one or more step lists including the one or more steps generated for the one or more further actions; and
       causing the display to output the second test scenario, the first test scenario, and the second test scenario comprising different step lists.

12. The system of claim 11, wherein the one or more actions include one or more of a keyboard event, a focus event, a mouse movement event, a mouse click event, a load event, or a drag and drop event.

13. The system of claim 11, wherein the operations further include:
    identifying each recorded step as a step type, the step type indicated by a step keyword associated with each recorded step.

14. The system of claim 13, wherein the step type is identified from a group of possible step types associated with step keywords including "given", "when," "then," "and," and "but".

15. The system of claim 13, wherein the step type for each recorded step is identified automatically upon detecting one or more actions performed by the user on one or more web page elements of a web application.

16. The system of claim 13, wherein a testing dashboard includes one or more interactive elements that is selectable by the user to manually set the step type for each recorded step.

17. The system of claim 13, wherein the operations further include:
   activating a test scenario editing interface, the test scenario editing interface displaying one or more step lists associated with at least one test scenario;
   receiving, via the test scenario editing interface, a manual assignment of a step keyword to one or more of the recorded steps from the user;
   modifying the one or more step lists based on the received manual assignment; and
   updating the at least one test scenario based on the modifying of the one or more step lists.

18. The system of claim 11, wherein the output of the display includes a visual indication of one or more of run status or validation status.

19. The system of claim 11, wherein the first test scenario specifies one or more preconditions for execution.

20. A computer-implemented method for testing a web application displayed by a web application browser extension, the method comprising:
   recording, by one or more processors, one or more actions performed by a user on one or more web page elements of a web application output on a display, for each action of the one or more actions:
      recording, by the one or more processors, a respective identifier of a web page element corresponding to the action;
      recording, by the one or more processors, a characteristic of the web page element; and
      generating, by the one or more processors, one or more steps based on the action, the respective identifier, and the characteristic;
   generating, by the one or more processors, a first test scenario specifying a testable outcome resulting from the one or more actions, the first test scenario comprising one or more step lists, the one or more step lists including the one or more steps generated based on the action, the respective identifier, and the characteristic;
   recording one or more further actions performed by the user on the first test scenario;
   generating a second test scenario based on the first test scenario as modified by the one or more further actions, the second test scenario comprising one or more step lists, the one or more step lists including the one or more steps generated for the one or more actions; and
   causing the display to output the second test scenario, the first test scenario and the second test scenario comprising different step lists.

* * * * *